United States Patent [19]
Butler

[11] 3,960,723
[45] June 1, 1976

[54] MAGNETIZATION OF IRON CHROMIUM SYSTEM

[75] Inventor: James W. Butler, Dearborn Heights, Mich.

[73] Assignee: Ford Motor Company, Dearborn, Mich.

[22] Filed: Dec. 26, 1972

[21] Appl. No.: 317,919

[52] U.S. Cl................................ 210/42 S; 210/50; 423/25; 75/109
[51] Int. Cl.² ........................................ C02B 1/20
[58] Field of Search ................ 210/42, 50, 49, 222, 210/223; 186/19; 134/10, 13; 252/79.1; 75/108, 109; 423/25, 35, 55, 609, 607, 34

[56] References Cited
UNITED STATES PATENTS

| | | | |
|---|---|---|---|
| 3,288,599 | 11/1966 | Keyes............................. | 156/19 UX |
| 3,399,090 | 8/1968 | Caropreso et al. .................. | 134/13 |
| 3,537,896 | 11/1970 | Nohse et al........................... | 134/13 |
| 3,575,853 | 4/1971 | Gaughan et al...................... | 210/50 |
| 3,575,854 | 4/1971 | Richards.............................. | 210/50 |

OTHER PUBLICATIONS
Tsantker et al., "Hermetic Apparatus for Carrying Out Processes in a Fluidized Bed"Chem. Abs. 75:7781n (1971).

Primary Examiner—Charles N. Hart
Assistant Examiner—Benoit Castel
Attorney, Agent, or Firm—Joseph W. Malleck; Keith L. Zerschling

[57] ABSTRACT

The present invention relates to a process for treating aqueous waste solutions containing complexing or oxidizing agents and dissolved metallic elements or compounds of copper, chromium, nickel, lead or tin. The waste solution is treated with finely divided magnetized ferrous particles, continuing such treatment to allow for homogeneous stirring promoting substantial ion exchange between the solute and ferrous particles, and providing a post-treatment step using an agent to promote precipitation of metallic hydroxides. The precipitates are separated from the solution by deposition in a settling tank and/or filtration.

7 Claims, 4 Drawing Figures

*Inventive Method*

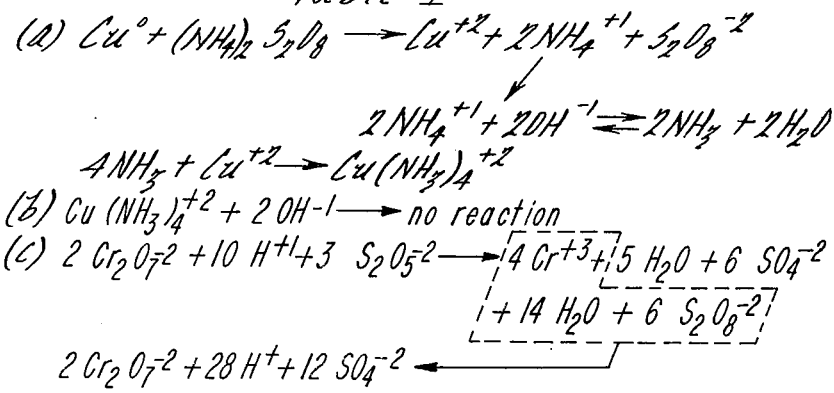

*Table I*

(a) $Cu^0 + (NH_4)_2 S_2O_8 \rightarrow Cu^{+2} + 2NH_4^{+1} + S_2O_8^{-2}$ $2NH_4^{+1} + 2OH^{-1} \rightleftharpoons 2NH_3 + 2H_2O$ $4NH_3 + Cu^{+2} \rightarrow Cu(NH_3)_4^{+2}$ (b) $Cu(NH_3)_4^{+2} + 2OH^{-1} \rightarrow$ no reaction (c) $2Cr_2O_7^{-2} + 10H^{+1} + 3S_2O_5^{-2} \rightarrow [4Cr^{+3} + 5H_2O + 6SO_4^{-2}$
$+ 14H_2O + 6S_2O_8^{-2}]$ $2Cr_2O_7^{-2} + 28H^+ + 12SO_4^{-2} \leftarrow$

*Table II*

(d) $Cu^{+2} + 4NH_3 \rightarrow Cu(NH_3)_4^{+2}$
$\{Cu^{+2} + Fe^0 \rightarrow Cu^0 + Fe(II)$
or $Cu(NH_3)_4^{+2} + Fe^0 \rightarrow Cu^0 + Fe(II) + 4NH_3$ (e) $2Cr(VI) + 3Fe^0 \rightarrow 3Fe(II) + 2Cr(III)$
$Cr(VI) + 3Fe(II) \rightarrow 3Fe(III) + Cr(III)$ (f) $S_2O_8^{-2} + Fe(II) \rightarrow SO_4^{-2} + Fe(III)$
$S_2O_8^{-2} + Fe^0 \rightarrow SO_4^{-2} + Fe(II)$
$S_2O_8^{-2} + Cu^0 \rightarrow Cu^{+2} + SO_4^{-2}$ (g) $Cr(III) + 3(OH)^{-1} \rightarrow \underline{Cr(OH)_3}$
$Fe^{+3} + 3(OH)^{-1} \rightarrow \underline{Fe(OH)_3}$
$Ni^{+2} + 2(OH)^{-1} \rightarrow \underline{Ni(OH)_2}$
$Sn^{+2} + 2(OH)^{-1} \rightarrow \underline{Sn(OH)_2}$
$Pb^{+2} + 2(OH)^{-1} \rightarrow \underline{Pb(OH)_2}$

*Table III*

| Sample | pH (After 16 Hours) | pH (Adjusted) | Chromium Conc. ppm | Copper Conc. ppm | MV |
|---|---|---|---|---|---|
| T-Cr-1 (no Fe) | 2.7 | — | 20.56 | 15.00 | -520 |
| T-Cr-2 | 3.3 | — | 15.55 | 7.57 | 150 |
| T-Cr-3 | 3.5 | 7.0 | 2.28 | 2.44 | 133 |
| T-Cr-4 | 3.5 | 8.2 | 5.84 | 5.25 | 130 |
| T-Cr-5 | 3.5 | 8.9 | 5.56 | 4.84 | 130 |
| U-Cr-1 (no Fe) | 2.7 | — | 20.88 | 15.07 | -313 |
| U-Cr-2 | 2.8 | — | 21.08 | 15.19 | -367 |
| U-Cr-3 | 2.7 | 8.2 | 21.14 | 14.52 | -410 |
| U-Cr-4 * | 3.0 | 7.3 | 2.16* | 0.86* | -285 |
| U-Cr-5 | 2.75 | 9.2 | 20.91 | 14.14 | -420 |

MAGNETIZATION OF IRON CHROMIUM SYSTEM

BACKGROUND OF THE INVENTION

Water-soluble chromates, and other water-soluble metallic compounds are widely found in industrial waste waters, either by intentional addition or as a result of pickup when water is used as a rinse for objects previously subjected to solutions containing ionic metallic elements which will then form the compound. When added directly to an aqueous solution, the use of compounds including water-soluble chromates save millions of dollars yearly due to their capacity to reduce scale formation and inhibit corrosion of metallic structures conveying or making use of water. Probably the most representative system wherein chromates have found the most use, is in industrial water systems, wherein heat exchangers, cooling tower elements, and condenser are continually in contact with water. In addition, chromates are commonly used in the electroplating industry.

A particularly troublesome condition is presented when water is used to rinse copper-printed circuit boards having previously been subjected to an etchant such as ammonium persulfate. If solely concerned with this batch of waste water, a sodium hydroxide treatment would be applied to hopefully precipitate the copper. However, a disadvantageous condition results in that the copper is prevented from combining with the hydroxide to form a precipitate because the ammonium radical of the etchant preferentially complexes the copper to form a soluble compound — tetraamine copper (II). However, waste water which may contain chromium is typically kept separate from the waste water containing the etchant. This is necessary because a reducing agent, such as sodium metabisulfite or the equivalent, is used to reduce hexavalent chromium for purposes of precipitation; it would be insufficient to treat the waste waters as combined, since sodium metabisulfite would be of no help in converting the etchant laden copper waste water. In addition, unused sodium metabisulfite would hinder the effectiveness of biocides which are used later at a municiple treatment plant.

When the chrome laden waste water is treated separately with the sodium metabisufite and then later combined with the copper laden waste water for final treatment with sodium hydroxide, another disadvantageous condition results. The persulfate oxidizes the reduced chromium back to hexavalent chrome. Neither the complexed copper nor the hexavalent chromium responds to the later hydroxide treatment to precipitate out the metallic elements. Thus, the complexed waste water is not treatable by present methods.

Other complexing agents rendering the same type of results comprise cobalt III, peroxide, permanganate, bromates and possibly lead dioxide or even chlorine. By use of the present invention, such complexing agents can be put to good use in assisting precipitation rather than in blocking precipitation.

SUMMARY OF THE INVENTION

This invention concerns a method by which a plurality of metallic ionic elements can be simply and rapidly precipitated from an aqueous solution so as to leave the solution in a nontoxic and unobjectionable condition from the standpoint of health and environment.

A particular object is to provide a singular treatment for waste water that contains both chromium and complexing agents.

Still further, an object of this invention is to provide a method of treating waste water containing various ionic metallic elements, such method preventing the discoloration of the treated water.

Features pursuant to the above objects comprise the addition of finely divided ferrous particles which are then magnetized and uniformly stirred, the treatment being followed by the addition of material to increase the pH of the solution. If the solution contains hexavalent chromium, the treatment will reduce to trivalent chromium which is readily removed by typical precipitation methods, the speed of such reaction being increased substantially by the use of magnetized iron particles.

Tables I and II list various chemical equations representing the reactions that take place respectively with a conventional waste-treating method for copper and chromium and with the inventive method.

Table III lists original data for the tests in which the inventive method was discovered.

DETAILED DESCRIPTION

Figures 1, 2:
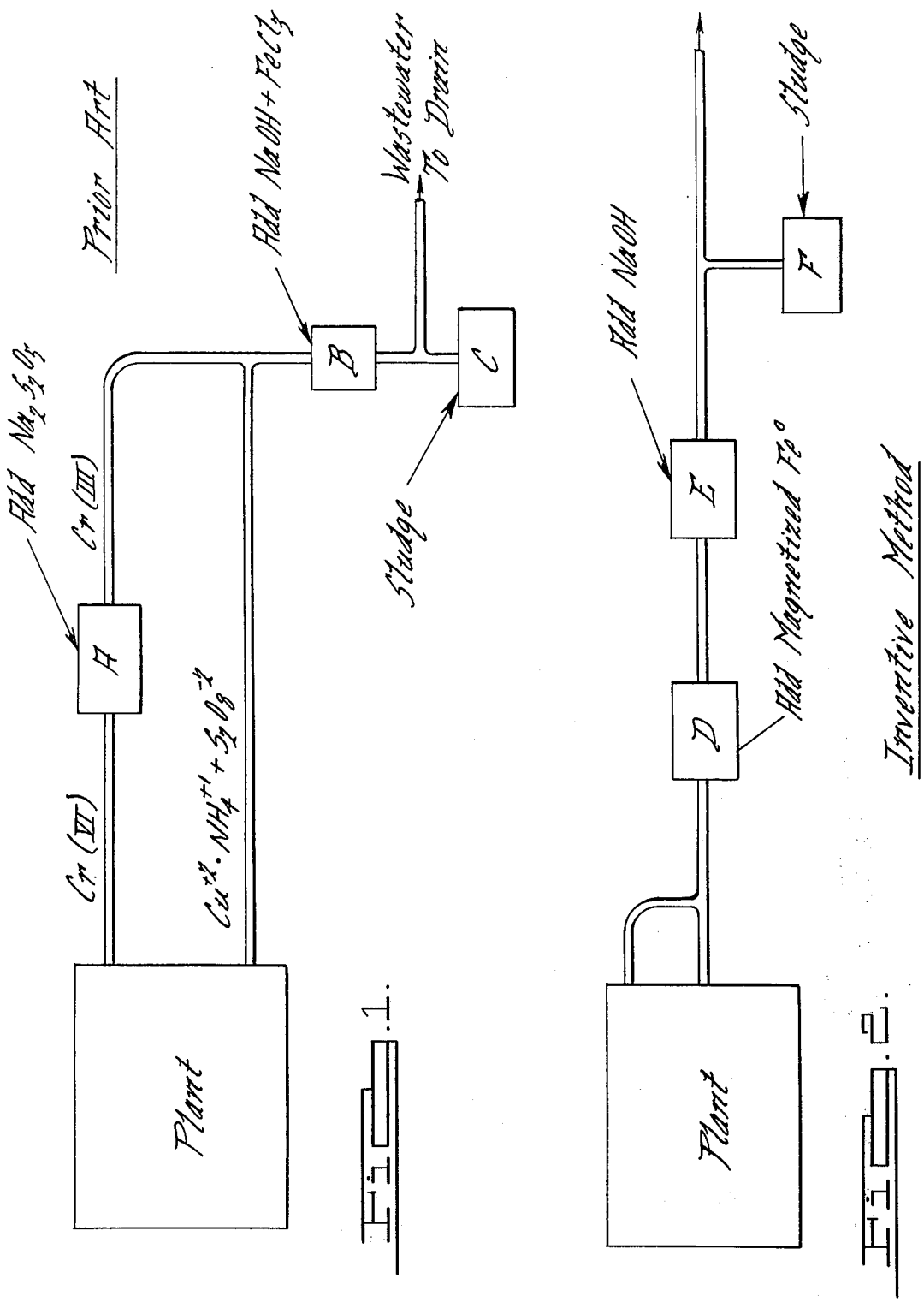
FIG. 1 is a schematic flow diagram of a typical method currently in use for treating waste water containing chromium and copper etchants.
FIG. 2 is a schematic flow diagram for the inventive treatment.

This invention is particularly advantageous in treating waste water containing toxic levels of soluble metallic elements selected from the group consisting of hexavalent chrome, nickel, copper, lead and tin. To illustrate the difference in processing over the prior art, FIG. 1 depicts the steps involved in conformity with present technology for processing waste water from a plant which introduces chromium at one station and introduces copper and an accompanying etchant at another station. As previously described, the chromium containing waste water is preferably treated separately in a tank A by the addition of a reducing agent such as sodium metabisulfite or sulfur dioxide is bubbled through the waste water. In either case, hexavalent chromium is reduced to trivalent chromium; the reaction (c) in Table I takes place with the addition of sodium metabisulfite. The copper and etchant containing waste water undergo certain chemical reactions such as indicated by reactions (a) in Table I. The etchant $(NH_4)_2S_2O_8$ combines with copper to form copper (II), $NH_4^+$ and metabisulfite. The designation II or III, used with a chemical name, will hereafter mean the valence value of the chemical radical. The $NH_4^+$ combines with $OH^-$ to form $NH_3$ and water. Unfortunately, $NH_3$ preferentially combines with the copper (II) to form a complex soluble compound in the form of a tetraamine copper. There is no reaction between the copper (II) tetraamine complex and the OH radical in the hopes of forming a copper hydroxide precipitate in tank C when NaOH is added in tank B (reaction b). Sometimes $FeCl_3$ is added as a flocculating agent to assist in increasing the precipitation.

Additionally, the presence of the persulfate radical oxidizes the trivalent chromium to reform hexavalent chromium which is stable in all pH ranges and is therefore not susceptable to a hydroxide treatment in tank B for precipitation (see reaction C). It is desirable to retain and increase the trivalent constituent because it is stable only in neutral to low pH ranges (acid) and therefore will precipitate out on the addition of sodium hydroxide forming a basic solution.

To overcome these disadvantages, the inventive method as schematically represented in FIG. 2 (and accompanying reactions in Table II) combines the waste water from both the chromium adding station and the copper etching station and simultaneously treats them first in a tank D with addition of magnetized ferrous particles, finely divided. To this end, a preferential fineness of the iron particles is contemplated having a mesh size of −200, +300. The iron should have an extremely high purity preferentially above 99.6% pure. After a period no greater than 15 minutes, the waste water is treated in tank E with NaOH to raise the pH of the solution for precipitating out metallic elements. A sludge from the precipitate is formed in a settling or filtration tank F which is separated from the purified waste water.

A laboratory method for carrying out the above process comprised the synthetic preparation of the waste water which was then placed in a beaker, the beaker being placed upon a base having a variable speed-controlled motor adapted to rotate a bar magnet directly beneath the base of the beaker. The bar magnet was sized to have sufficient magnetic penetrating capability for affecting the iron particles throughout the entire solution so that homogeneous mixing of the particles could be readily obtained.

Several reactions took place upon the addition and stirring of the magnetized iron particles. In Table II, reactions (d) show that copper (II) will plate out by exchange of electrons with the iron particles and $Fe°$ will become Fe (II); the heretofore complexing agent is broken up whereby tetra amine copper becomes free ammonia and copper is plated out. Hexavalent chromium will give up electrons to the iron particles to the iron particles to become Fe (II) and the chromium will become trivalent (see reaction e). Fe (II), a product of reaction (d) will assist also in reducing additional hexavalent chromium to trivalent chromium resulting in the formation of Fe (III). To speed the reaction faster, reaction (f) illustrates how, the oxidizing agent $S_2 O_8^{-2}$ (persulfate) will combine with $Fe°$ to form $SO_4$ and Fe (II); simultaneously the persulfate radical will combine with Fe (II) to form more Fe (III) and $SO_4^{-2}$. It should be noted that Fe (II) assists in the further reduction of hexavalent chromium and in reduction of $(S_2O_8)^{-2}$. Fe (III) also acts as a flocculating agent. The sulfate radical of course remains dissolved in the waste water but is harmless. The persulfate radical $(S_2O_8)^{-2}$ is also capable of combining with $Cu°$ which has been plated out to form copper (II) plus sulfate, but this reaction tends to be reversed by the further stirring of magnetized iron.

Depending upon the quantity of waste water being treated, the response time of the reactions (d), (e) and (f) of Table II, will take place in a matter of minutes, permitting the treated waste water to be transferred to another beaker where the pH of the solution may be increased by the addition of sodium hydroxide to thereby form the precipitate $Cr(OH)_3$ and $Fe(OH)_3$ — see reaction (g). If other metallic elements were added to the waste water, such as nickel, tin and lead, they would form precipitants as indicated in (g).

The presence of the agent ammonium persulfate does not block the reduction of hexavalent chrome nor the formation of copper hydroxide because the reactivity potential of the iron particles is much greater than the persulfate agent. Without the use of the magnetized iron particles, the ammonium persulfate would normally become a complexing agent. A complexing agent for the purposes of this invention is defined as any composition which under normal basic conditions renders an insoluble species to become soluble. More broadly, a complexing agent is a coordination compound where the central atom or ion (usually a metal) is surrounded by a cluster of ions or molecules. A preferred class of complexing agents which are disarmed by the use of the present invention comprise the following: Cobalt (III), peroxide $H_2O_2$, permanganate $MnO_4^-$, bromate $Br O_3$, lead dioxide $Pb O_2$, and pyrophosphate $P_2 O_7$. With each of these complexing agents, the presence of Fe (II) will form respectively $SO_4^{-2}$, $Co^{+2}$, $H_2 O$, $MnO_2^{+2}$, $Br_2$, $Pb^{+2}$, and $P_2 O_7^{-2}$. They are all removable from solution by the addition of hydroxide to increase the pH.

The elements copper, chromium copper, lead, tin and nickel can create toxic effects in finished drinking water. It is generally known through public health services that the following limits are standard to prevent a public health hazard: Copper (1 mg/l), chromium (0.05 mg/l), lead 0.05 mg/l), tin (0.03 mg/l) and nickel (0.04 mg/l). Pursuant to obtaining non-toxic levels of each of these elements, the present method can reduce copper to less than 1 part per million, hexavalent chromium to less than 0.2 parts per million, trivalent chromium to less than 2.3 parts per million and nickel to less than 1.0 part per million.

The discovery of the effect of magnetized iron, as opposed to conventional unmagnetized particles, took place during a series of tests resulting in data represented in Table III. The sample tests were of generally two types, those which had a synthesized complexed chromium concentration treated with sodium metabisulfate (labeled with a T), and those which were untreated (labeled U). In each of the sample tests, 50 milliliter aliquots of synthesized waste water were placed in 150 milliliter beakers. To four of these were added 25 milligrams of powdered iron (T-Cr-2 to T-Cr-5). All five samples were allowed to stand overnight for the equivalent of 16 hours. The same procedure was repeated using five aliquots of untreated synthesized chromium solutions, only one sample (U-Cr-4) marked with an asterisk was treated with magnetized iron particles. Again the samples were left overnight for a period of 16 hours to observe any reaction.

The next day, all of the samples were adjusted in pH to various levels between 7 and 9.2. The samples were centrifuged and the supernates were run by atomic absorption for chromium and copper concentration. The sample U-Cr-4 had the lowest chromium concentration of 2.165 ppm. This was the only sample utilizing magnetized iron particles. These results indicate that magnetized iron particles seem to have an effect for reacing ultra low levels of chromium concentrations.

To further explore the time of reaction for magnetized iron, two 25 milliliter aliquots of complexed chromium waste water were placed in polystyrene bottles to which was added 25 milligrams of iron particles (Fe°). With one bottle, the Fe° was magnetized. Both bottles were shaken for 15 minutes; the magnetized sample was orange in color and the other had no change. Then two 25 milliliter aliquots of complexed waste water with a 25 ppm concentration of chromium were pipetted into beakers. 25 milligrams of powdered iron were added simultaneously. One was magnetized and one was not. Then a PT-SCE redox electrode was used to follow the electrical potential as a function of time.

| Bottle 1 (magnetized) | Bottle 2 (unmagnetized) |
|---|---|
| zero minutes – 496 mv. | zero minutes – 443 mv. |
| 35 minutes – 70 mv. | 35 minutes – 395 mv. |
| 3 hours – 17 mv. | 3 hours – 290 mv. |

The obvious conclusion is that the reduction of hexavalent chrome in the presence of a complexing or oxidizing agent occurs much faster with the use of magnetized iron particles.

To confirm this phenomenon with various other metallic elements or treatment variations, the following examples were run.

EXAMPLE 1

A chromium-free synthesized waste water was prepared using 50 milliliters of conventional tap water with a pH of about 3.0 and adding 25 milligrams of copper compound to provide a concentration of about 16 ppm. Consistent with a solution representing a rinse water used with copper printed circuits, ammonium persulfate $(NH_4)_2 S_2O_8$ was added in a quantity of grams similar to that to be experienced in practice. The pH was increased to 9.8 through the addition of a caustic compound (Na OH) but the quantity added had little, if any effect, upon the total copper concentration. It was then assumed that the copper solubility at high pH (7–10) is due to the formation of a copper ammonia complex $[Cu(NH_3)_4^{+2}]$ and therefor an attempt was made to remove the ammonia from solution by increasing the pH to about 9.6 followed by the bubbling of air through the solution for approximately 2 hours. This treatment was expected to volatize any large amounts of ammonia, thus rendering the copper insoluble. This attempt failed because the copper concentration remained high even at a pH of 9.6. Thus it was concluded that air purging is not effective as a method in removing ammonia at the levels to be experienced or another chemical specie is present which further complexes copper and is similarly not removed by air purging. Some other treatment is therefore necessary to meet the suggested levels of purity.

The same solution was further treated by the use of metallic iron for affecting the copper in the presence of the ammonium persulfate. The iron treatment was to have two advantages, namely the reduction of hexavalent chromium to the readily insoluble trivalent chromium if used in treating chromium contaminated waste water, and at the same time remove the strong oxidizer persulfate. The iron used in this specific example was nonmagnetized powder and had a mesh size of –200 to +300 and an iron purity of 99.9%. 15 milligrams of iron powder was added. Subsequent caustic treatment was used to increase the pH. It was found that much lower concentration levels could be achieved (here 40 ppm at a pH of 7.2) but at the expense of time which was greater than 16 hours. The suggested level of less than 3.0 ppm of copper was not achieved in this example because of insufficient iron powder.

EXAMPLE 2

Figure 3:
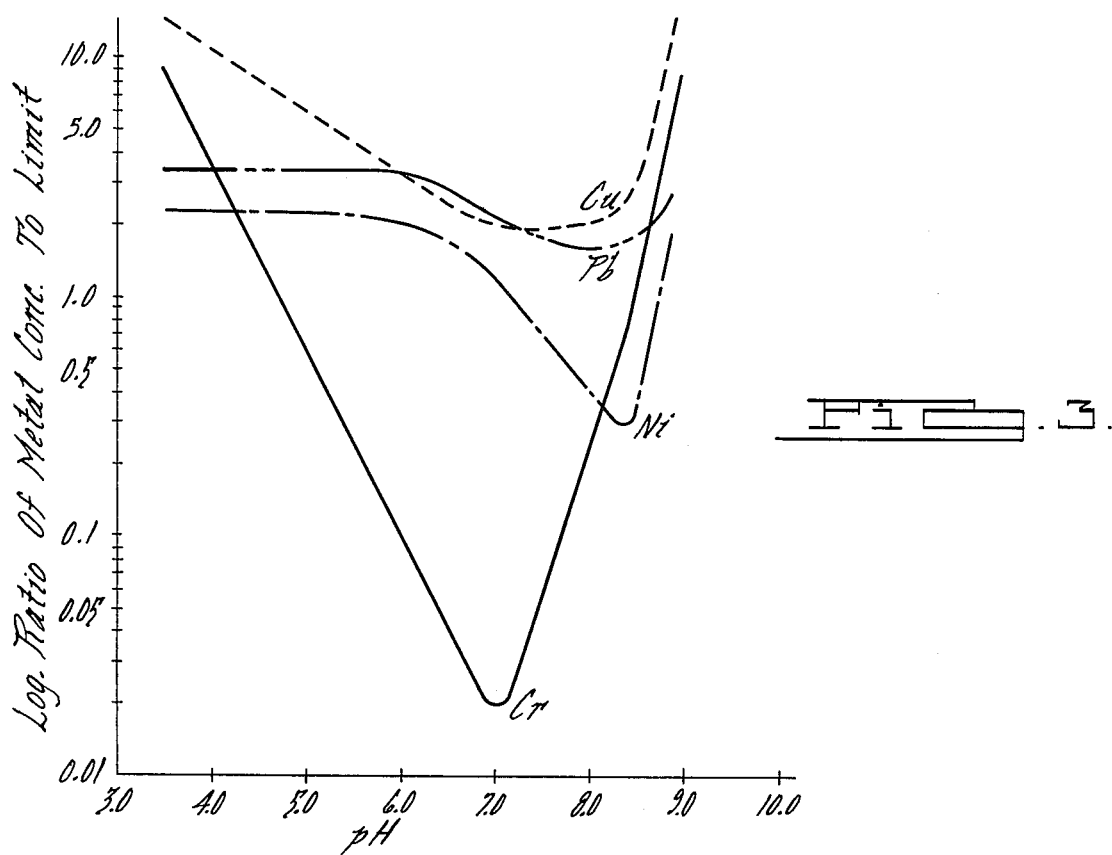
FIG. 3 is a comparative graphical illustration for one test example plotting the ratio of various metallic concentrations to a suggested limit as a function of pH.

A second synthetic sample was prepared containing chromium and copper; sodium metabisulfite was used to pretreat the chromium. To 50 milliliters of tap water was added copper to provide a concentration of 14.6, chromium to provide a concentration 21.0, nickel to provide a concentration of about 1.2, lead of about 0.34. Iron again in the form of electrolytic powder of a purity of about 99.9% was added to the sample solution and was magnetized through exterior means which also provided stirring of the solution to insure homogeneous contact between the magnetized particles and the ionized metallic elements in solution. The exterior means was a bar magnet rotated by a motor, the magnet being placed immediately beneath the beaker containing the solution. Caustic addition was performed subsequent to the magnetizing treatment so as to vary the pH throughout the full range. FIG. 3 represents the results of this example and plots logarithmically the ratio of the actual metal concentration to the suggested limit as a function of pH. The dependency of copper and lead solubility on the final pH of the solution, as well as the effect of further addition of magnetized iron, suggests insufficient iron was used in this particular experimental example to remove a maximum amount of copper and lead. However, the example demonstrated the ability of magnetized iron to reduce total chromium to zero parts per million level, with a minimum solubility at a pH of about 7.0, was well below the suggested limit of 2.0 ppm $Cr^3$ and 0.2 ppm of $Cr^6$. A minimum solubility of nickel was achieved with 0.275 parts per million at a pH of 8.4. Lead was removed by the magnetized iron/caustic treatment and achieved a minimum solubility of 0.15 ppm at a pH of 8.4 in this specific example. The ratio in FIG. 3 implies all values above a ratio of 1.0 are undesirable. Therefore, FIG. 3 would indicate that an optimum pH for all the metals in the example would be about 8.2. Most notable is the face that the concentrations of the metal ions increase sharply after a solubility minimum is reached with this treatment.

EXAMPLE 3

Figure 4:
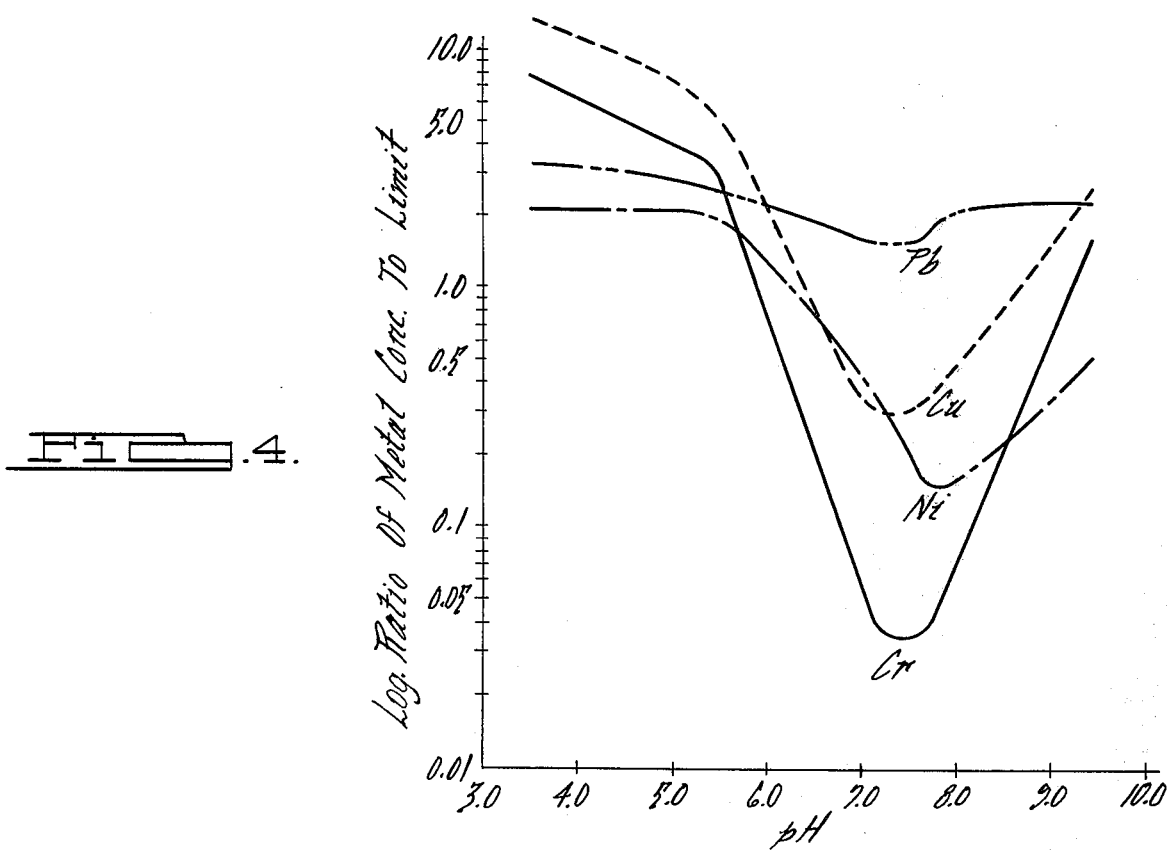
FIG. 4 is a graphical illustration of another test example depicting the metallic concentration of various metals as plotted against the optimum pH value for the particular concentration.

In this example, an aqueous solution similar to Example 2 was prepared but containing untreated hexavalent chromium (that is a chromium component not previously reduced to a trivalent chromium by use of sodium metabisulfite. The results of this particular example indicate that the pre-reduction of chromium is unnecessary. Iron powder having a mesh size of –100 to +200 was added to the 50 ml. aliquot of tap water (containing concentrations of the metallic elements and complexing agent — $(Na_4)_2 S_2O_8$. The amount of iron used was increased to provide an equivalent of 73 lbs. of magnetized iron for each 80,000 gallons of waste water. Considerably lower minimum solubility levels were reached than those achieved with conventional iron particles. Thus, pretreatment of chromium is unnecessary. FIG. 4 summarizes the test results by plotting logarithmically the ratio of the actual metal concentration to the suggested limit as a function of pH. Minimum solubility levels were achieved at an optimum pH value of about 7.8 which is less than that achieved with other examples and therefore would indicate that less rigid control over pH would be necessary if the chromium were in the hexavalent state prior to addition of magnetized iron and caustic treatment.

I claim as my invention:

1. A method of treating waste water containing solutes from the group consisting of chromium, copper, nickel, lead and tin, and a complexing agent for said solute, the method comprising:
   a. introducing magnetized ferrous particles to said waste water,
   b. adjusting the pH of said water at least above 6.3 whereby compounds formed from said solute are optimally precipitated to produce a water purity characterized by a copper concentration less than 1 ppm, a trivalent chromium concentration less than 2.1 ppm, and a nickel concentration less than 1.0 ppm.

2. The method of claim 1 in which said magnetized particles are stirred for a period of time no greater than 15 minutes prior to adjusting said pH.

3. The method as in claim 1, in which said ferrous particles are comprised of electrolytic iron powder having a particle size in the range of −100 to +300 and iron purity of about 99.8%.

4. A method of treating waste water as in claim 1, in which said complexing agent comprises a chemical radical selected from the group consisting of persulfate, cobalt (III), peroxide, permanganate, bromate, lead dioxide and phosphate.

5. The method as in claim 1, in which said ferrous particles are added in the unmagnetized condition and then subjected to a magnetic field while in said solution.

6. A method of treating waste water containing dissolved elements of hexavalent chromium, copper, ammonium persulfate, the steps comprising:
   a. introducing magnetized ferrous particles to said waste water to reduce said hexavalent chromium to trivalent chromium and to plate out said copper, and
   b. increasing the pH of said solution above 6.3 to precipitate chromium hydroxide.

7. The method as in claim 6, in which said waste water additionally contains elements selected from the group consisting of nickel, tin and lead, and precipitates being formed with said additional elements upon increasing the pH.

* * * * *